United States Patent
Gorodyansky et al.

(10) Patent No.: US 11,023,926 B2
(45) Date of Patent: *Jun. 1, 2021

(54) COMPUTERIZED SYSTEM AND METHOD FOR ADVANCED ADVERTISING

(71) Applicant: Pango Inc., Redwood City, CA (US)

(72) Inventors: David Gorodyansky, San Francisco, CA (US); Dimitry Govrilov, San Francisco, CA (US)

(73) Assignee: PANGO INC., Redwood City, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 14/253,848

(22) Filed: Apr. 15, 2014

(65) Prior Publication Data
US 2015/0019336 A1   Jan. 15, 2015

Related U.S. Application Data

(63) Continuation of application No. 12/825,239, filed on Jun. 28, 2010, now Pat. No. 8,700,603, which is a continuation of application No. 11/291,688, filed on Nov. 30, 2005, now Pat. No. 7,747,619.

(51) Int. Cl.
| | |
|---|---|
| *G06F 7/00* | (2006.01) |
| *G06Q 30/02* | (2012.01) |
| *G06F 16/951* | (2019.01) |
| *G06F 16/958* | (2019.01) |
| *G06F 16/9535* | (2019.01) |

(52) U.S. Cl.
CPC ....... *G06Q 30/0259* (2013.01); *G06F 16/951* (2019.01); *G06F 16/958* (2019.01); *G06F 16/9535* (2019.01); *G06Q 30/02* (2013.01); *G06Q 30/0255* (2013.01); *G06Q 30/0256* (2013.01); *G06Q 30/0264* (2013.01)

(58) Field of Classification Search
CPC ... G06F 16/248; G06F 16/958; G06F 30/0259
USPC ........................................................ 707/769
See application file for complete search history.

(56) References Cited

U.S. PATENT DOCUMENTS

| | | | | |
|---|---|---|---|---|
| 6,269,378 | B1 * | 7/2001 | Quirt | G06F 9/465 |
| 6,667,736 | B1 * | 12/2003 | Bhansali | G06F 9/454 |
| | | | | 345/171 |
| 7,328,263 | B1 * | 2/2008 | Sadjadi | G06F 9/526 |
| | | | | 707/999.008 |
| 7,506,023 | B2 * | 3/2009 | Keohane | G06F 1/14 |
| | | | | 707/999.201 |

(Continued)

*Primary Examiner* — Eliyah S. Harper
(74) *Attorney, Agent, or Firm* — David R. Stevens; Stevens Law Group

(57) ABSTRACT

The invention provides an improved algorithm for selecting paid advertisements for inclusion with search engine results or with any resource retrieved from the Internet. The algorithm collects personalized data of each user and feeds the collected personalized data into search queries of search engines, to retrieve paid advertisements. The advertisements are retrieved based not only on search keywords input by the user, but also based on personal preferences, interests and demographics of the user, as well as the location of the user and the time when the search is performed. In other words, the inventive technology enables each user to receive very targeted, localized and personalized advertising materials.

13 Claims, 10 Drawing Sheets

(56) References Cited

U.S. PATENT DOCUMENTS

| | | | |
|---|---|---|---|
| 2002/0032698 A1* | 3/2002 | Cox | G06F 16/41 |
| | | | 715/210 |
| 2004/0139171 A1* | 7/2004 | Chen | G06F 16/9574 |
| | | | 709/218 |
| 2004/0143644 A1* | 7/2004 | Berton | G06F 16/2471 |
| | | | 709/217 |
| 2005/0182783 A1* | 8/2005 | Vadai | G06F 16/337 |
| 2005/0222989 A1* | 10/2005 | Haveliwala | G06Q 30/02 |
| 2007/0260742 A1* | 11/2007 | Clark | G11B 27/002 |
| | | | 709/231 |

\* cited by examiner

```
┌─────────────────────────────────────────────────────────────────────┐ 200
│ XYZ  My XYZ  Mail   Welcome, Guest [Sign in]                      ^ │
├─────────────────────────────────────────────────────────────────────┤
│                        Web | Images | Video | Directory             │
│          XYZ SEARCH  [ hotels              ]  [ Search ]            │
│  Search Results              Results 1-10 of about 18,800,000 for cars. (0.31 seconds)
│  ┌───────────────────────────────────────────────────────────────┐  │
│  │                                              SPONSOR RESULTS  │  │
│  │                                                               │  │
│  │  · Crowne Plaza Palo Alto Official site. Low Internet rates guaranteed on Palo Alto hotels. Whether traveling
│  │  ∕ for business or leisure, at Crowne Plaza you'll make personal and business connections that matter.
│  │    www.crowneplaza.com
│  │ 201
│  │
│  │  · Orbitz Low Hotel Rages in Palo Alto, CA Find a wide selectin of Palo Alto, CA hotels sorted by star rating,
│  │  ∕ distance and price. Guaranteed low rates on OrbitzSaver hotels. Just Orbitz and go!
│  │ 202 www.orbitz.com
│  │
│  │  · CheapTickets® Second Annual Spring Sale Palo Alto hotel - Book now to save big on hotels at
│  │  ∕ CheapTickets. Rates have a 110% low price guarantee, and vacation packages, car rentals, and cruises all on
│  │ 203 sale too.
│  │    www.cheaptickets.com
│  └───────────────────────────────────────────────────────────────┘
│                                                                      
│  XYZ Hotels in Palo Alto, CA – photos, reviews and deals  ⌐204
│  Days Inn – Palo Alto, CA - ★★★★☆ - from $73.60 – map – availability – rate it
│  Garden Court Hotel – Palo Alto, CA - ★★★★★ - from $379.00 – map – availability – rate it
│  The Westin Palo Alto – Palo Alto, CA - ★★★★☆ - from $269.00 – map – availability – rate it
│                                                                    v │
└─────────────────────────────────────────────────────────────────────┘
```

Fig. 2

```
XYZ  My XYZ  Mail   Welcome, Guest [Sign in]                                    ⌃ 400

Web | Images | Video | Directory
              XYZ SEARCH  | pizza                    |   Search Search Results                              Results 1-10 of about 18,800,000 for cars. (0.31 seconds)
                                                                       SPONSOR RESULTS 1. Lunch Menu - Pizza
      IL Forno NY Pizza & Pasta...Full Lunch Menu Appetizers Salads Oven Baked Specials Hot Sandwiches
  401 Pizza Pasta Beverages...Traditional NY style pizza with tomato sauce and mozzarella...
      www.ilfornonypizza.com/menus/lunch/pizza.com - 24k - Cached - More from this site - Save - Block 2. Olive Garden Italian Restaurant: Our Menus
      Appetizers, dinner, lunch, soup, salads, even Pizza to go: Olive Garden offers a delicious selection of
      genuine Italian cuisine, inspired by our culinary institute in Tuscany. Order for the office with Parties To go.
  402 www.olivegarden.com/ourmenus - 11k - Cached - More from this site - Save - Block 3. Elementary School Lunch Menu
      ...Elementary School Lunch Menu. Berryessa Union School Distrcit I District Mission Statement I School
      Accountability Report ... 7. Pizza Pocket. 8...
  403 www.berryessa.k12.ca.us/id32.htm - 28k - Cached - More from this site - Save - Block 4. Lunch Menu – MAX Pizza
      ...Return Home School Calendar Lunch M enu Contact Us Documents & Lists Create Site Settings Help..
      Park Falls School District Lunch Menu: MAX Pizza...
  404 www.park-falls.k12.wi.us/Lists/Lunch Menu/DispForm.asp - 24k - Cached - More from this site - Save - Block
```

Fig. 4

COMPUTERIZED SYSTEM AND METHOD FOR ADVANCED ADVERTISING

CROSS-REFERENCE TO RELATED PATENT APPLICATIONS

The present U.S. patent application relies upon, claims the benefit of priority from, and is a continuation of U.S. patent application Ser. No. 12/825,239 filed on Jun. 28, 2010, now U.S. Pat. No. 8,700,603, which relies upon, claims the benefit of priority from, and is a continuation of U.S. patent application Ser. No. 11/291,688 filed on Nov. 30, 2005, now U.S. Pat. No. 7,747,619, the entire disclosure of both of which are incorporated by reference herein.

FIELD OF THE INVENTION

The present invention relates generally to searching technology and more specifically to a computerized system having a targeted advertising retrieval functionality.

DESCRIPTION OF THE RELATED ART

Modern Internet search derive substantial revenue from displaying advertisements to the users. Such advertisements, which are paid for by sponsors, are displayed to the users based on the keywords input by the users into the search engine as a part of the query or, alternatively, based on the content of the Internet resource (e.g. webpage) that the users view. The relevance of the displayed advertising materials to the user's preferences, interests and needs is of crucial importance and determines the value received by the advertiser from placing the ads with the search engine.

Unfortunately, the current technology for selecting advertisings for display, which relies primarily on the input keywords, does not take into account the location of the user, the time of the search, and the online personalized interests of the user. Therefore it would be desirable to have a system, which would enable search engines to provide more targeted advertising to the users.

SUMMARY OF THE INVENTION

The inventive methodology is directed to methods and systems that substantially obviate one or more of the above and other problems associated with conventional techniques for selecting advertising materials for display to the Internet user.

One aspect of the inventive concept is a method, computer programming product and a computerized system processing a user request. The inventive system includes a client computer system having a central processing unit directly accessed by the user. The client computer system receives a user request directed to a network entity. The inventive system additionally includes a gateway connecting the client computer system with the network, a location database storing location information, and a server. The server is configured to receive the user request; receive network address information of the user from the gateway; provide the received network address information to the location database; receive the user location information from the location database; append the received location information to the user request to produce the modified user request; and forward the modified user request to the network entity.

Another aspect of the inventive concept is a method for processing a client request. In accordance with the inventive method, the user request directed to a network entity is received by the inventive system. The system determines the location of the user based on the received request to produce location information. The location information is then appended the user request to produce a modified user request, which is forwarded to the network entity.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 shows an exemplary search results page displaying location-specific information generated by the inventive system.

FIG. 4 depicts an exemplary location and time specific search results an embodiment of the inventive system.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

One aspect of the inventive methodology provides improved algorithm for selecting paid advertisements for inclusion with search results of an internet search engine. The inventive algorithm collects specific personalized data related to each search engine user, as well as other pertinent information and includes the collected personalized data into search queries submitted to search engines, to retrieve paid advertisements. The advertisements are retrieved based not only on search keywords input by the user, but also based on personal preferences, interests and demographics of the user, as well as the location of the user and the time when the search is performed. In other words, the inventive technology enables each user to receive very targeted, localized and personalized advertising materials.

One embodiment of the inventive system includes a software platform for identifying location of the user and the time of the search. Additionally or alternatively, the inventive system may also contain functionality for collecting and storing personal information on each user. When the user issues a search query to the search engine, the inventive system furnishes the time, location and/or user's personal information to the search engine in order to enable the search engine to achieve the most targeted advertising.

Figure 1:
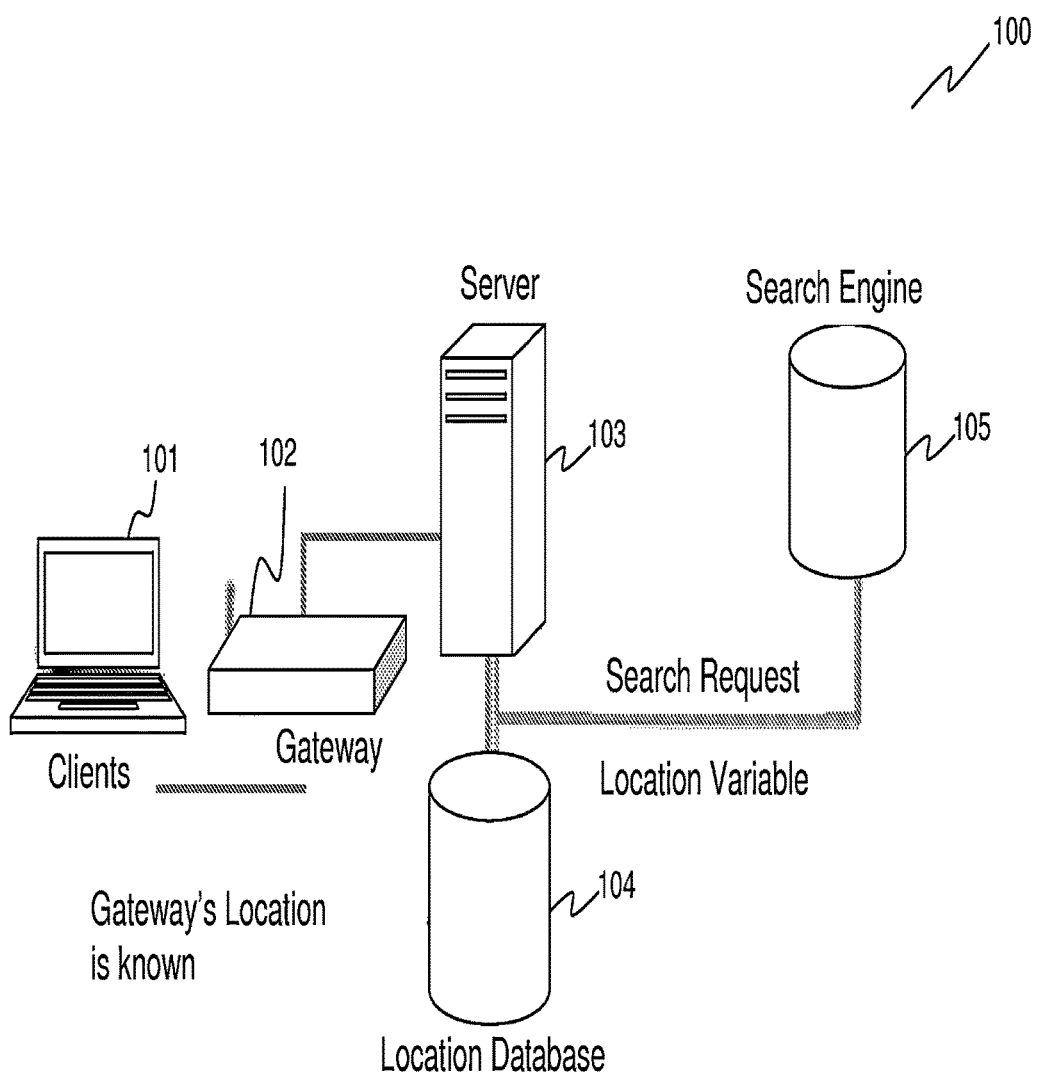
FIG. 1 depicts an exemplary architecture of the inventive system having the functionality for enabling user location-specific advertising.

FIG. 1 depicts an exemplary architecture of the inventive system having the functionality for enabling user location-specific advertising. The depicted system enables advertisers to add a location variable into their algorithms for retrieving targeted advertising materials. To this end, the inventive system shown in FIG. 1 has a capability to detect the origination point of the user's network traffic. The inventive technology feeds the location information for each Internet user into the search engine 105, which, in turn, provides customized advertising materials for each such Internet user taking into account the time and the user's location. The resulting advertisings may be city-specific, street-specific or even block-specific.

In order to determine the location information, Internet Service Providers and Wireless Internet Service Providers operating the gateway 102 feed the internet protocol (IP) addresses of their users 101 into the inventive software module located on the server 103. As well-known to persons of skill in the art, all Internet users are connected to routers on ISP networks and to gateways on wireless Internet networks. In accordance with the inventive methodology, to determine the location of a user issuing a search engine query, IP address of the wireless gateway utilized by the user is send to the inventive system. The inventive system checks the received IP address against its location database 104 to arrive at the user's location and feeds the user location data associated with each user search query into the search engine 105 configured to retrieve ads targeted to the specific location of the user, which may be city, street or block. In another embodiment of the invention, the user location may be determined from content of any website visited by the user.

Specifically, when user issues a query to a search engine containing one or more search terms, the query is received by the inventive system, which determines the current location of the user using the IP address associated with user's network connection. After the location of the user issuing query has been determined in the above-described manner, the inventive system adds a variable containing location information to the search request issued to the search engine, such that the operating algorithm of the search engine 105 uses the modified search request to perform its search.

For example, in an embodiment of the inventive system, if a user sitting in a café in downtown Palo Alto, Calif., issues a query to a search engine seeking information on hotels, the inventive system would use the user's IP address information to detect the user's present location and subsequently rewrites the user's search engine query changing it from "hotels" to "hotels+palo+alto". A search engine algorithm would then receive the location information as a part of the search query and would then return relevant location-specific results to the user. FIG. 2 shows an exemplary search results page 200 displaying location-specific information 201-204 generated by the inventive system.

Exemplary embodiments of search engines which are well known in the art include, without limitation, Google, Yahoo, Alta Vista, etc. The search engine may use its own technology to return the local search results to clients, based on the location feed from the inventive system through the modified query.

Figure 3:
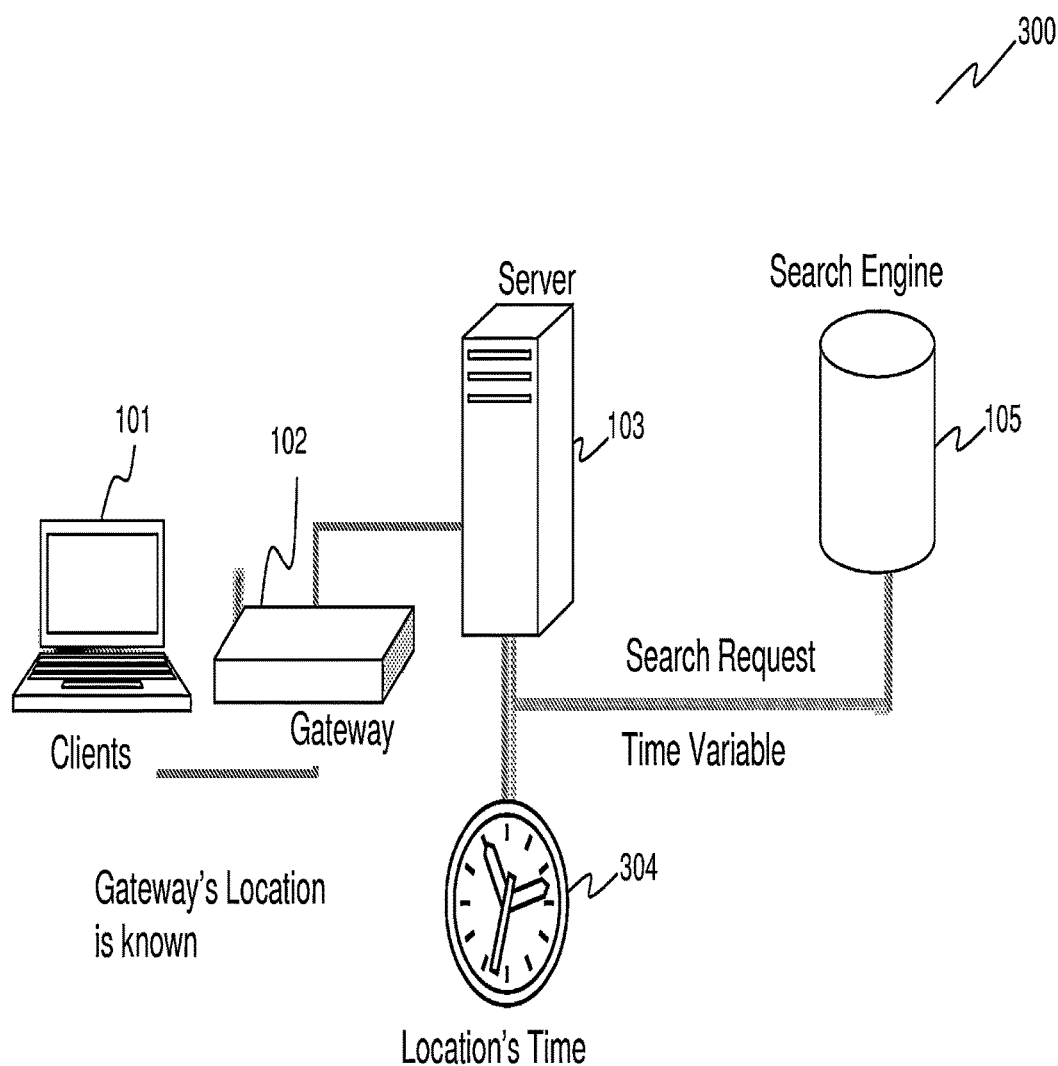
FIG. 3 depicts an exemplary embodiment of the inventive system providing the aforementioned time functionality.

In addition to, or as an alternative to the location information, another aspect of the inventive technology enables advertisers to add current time information to the search algorithm. When a user connected to the Internet through a network of Internet Service Providers and Wireless Internet Service Providers conducts a search using a specific search engine, the inventive software automatically furnishes the local time information to the advertiser, which may be used singly, or in combination with the location information in formulating new search engine query. Thus, the results provided by the search engine may be both location and time specific. FIG. 3 depicts an exemplary embodiment of the inventive system providing the aforementioned time functionality. Specifically, the depicted embodiment includes software module 304 for supplying local time at user's location and inserting this time information into the query issued to search engine 105. The remaining elements of the system depicted in FIG. 3 are similar for the corresponding elements of FIG. 1.

For example, when a user who is located in downtown Palo Alto, Calif., which is in Pacific time zone, searches for a pizza during a lunch hour, inputting keyword "pizza" into a search engine, the inventive system rewrites the user's query using the relevant location and time information. Such rewritten query may look, for example, similar to "pizza+palo+alto+1:30 pm". The search engine algorithm, after receiving the above search information, would provide relevant results for pizza places in Palo Alto, Calif., during lunch time. An exemplary location and time specific search results 401-404 generated by the described embodiment of the inventive system are shown (400) in FIG. 4.

Figure 5A:
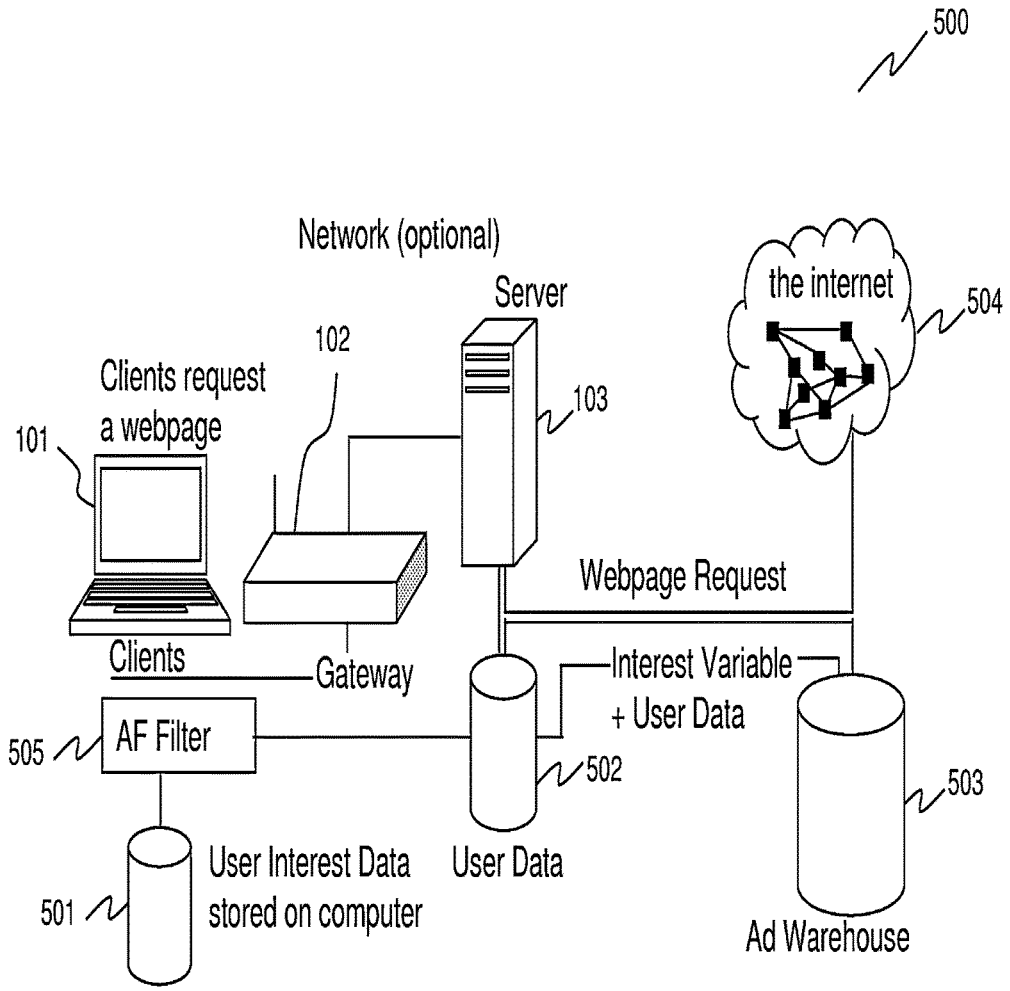
FIG. 5A depicts a schematic diagram illustrating an embodiment of the inventive system, which utilizes information on user's interests and/or personal preferences.

Another embodiment of the inventive technique inserts information on user's interests and/or personal preferences to each search query issued by the user. When a user performs an Internet search using the inventive system or a partner Internet Service Provider or Wireless Internet Service Provider, the inventive system automatically filters out advertising information that is not likely to be of value to the user thus enabling advertisers to present to the user only relevant results. In one embodiment of the inventive concept, the information on interests and preferences of the user is systematically collected by the inventive system and stored either within the server system 103 or in the user's computer. In addition, the inventive system may collect, store and use user's demographic information. FIG. 5 depicts a schematic diagram illustrating the aforementioned embodiment of the inventive system which uses information on user's interests and/or personal preferences. As would be appreciated by those of skill in the art, in the depicted embodiment, the user interest data is stored in the user's computer as designated by numeral 501. In addition, the inventive server 103 has an associated storage unit 502 for storing additional user data.

The embodiment of the inventive system depicted in FIG. 5 operates in the following manner. A user queries a search engine for a term. The query is received by the inventive filter system software 505 residing on the user's computer 101, which checks the identity and demographics of the user based on the information stored on user's computer and/or based on login information supplied by the user when he or she established connection to a wireless network. After the inventive filter software obtains the identity and demographics of the user, it analyses the received information and determines the likely preferences of the user. The user's likely preferences may be derived from the historical information on user's prior on-line activities, which is collected and stored by the inventive system.

Figure 5B:
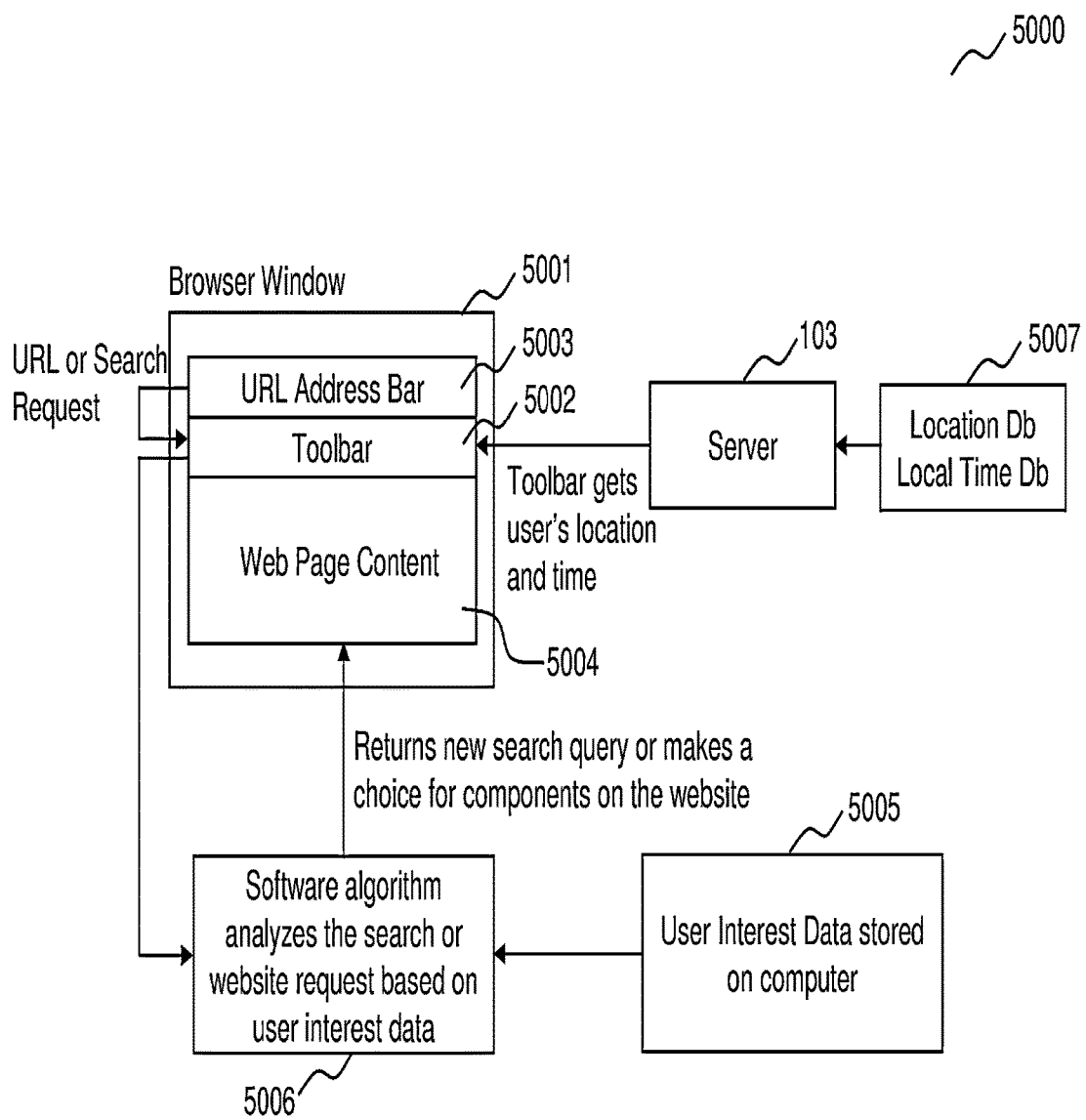
FIG. 5B illustrates operation of the inventive toolbar and inventive filter software.

The following description, together with FIG. 5B, provides additional details on operation of the filter system software 505, which may include an inventive toolbar 5002, and the user interest database 501. It should be noted that the inventive toolbar 5002 as well as other inventive software may be used in conjunction with any browser application 5001 installed on any computer platform, including, without limitation, Internet Explorer, Firefox, Netscape, etc. for either PC or MAC computers. The toolbar 5002 described herein may be a proprietary toolbar or, in the alternative, the inventive software can be incorporated into any existing toolbar, including, without limitation, Yahoo, Google, and MSN toolbars.

When a user inputs a request for a webpage into a URL address field 5003 of a browser 5001 or sends a search query to a search engine, the inventive toolbar 5002 intercepts the user's request and forwards it to the inventive software 5006. User's location and local time are requested from the database 5007 of the inventive server 103 every time the toolbar is started (i.e., a new browser window is opened). Both user's location and time are sent to the inventive software program for processing.

The inventive software algorithm 5006 analyzes the user-specified URL or a search request, user's location, query time as well as information on user's interests 5005, which is based on user's prior online activities stored on user's computer in the database structure or the like. If nothing related to user's new request is found in the database 5005, the new request is added to the database 5005 and modified query is returned to the webpage 5004 or a search engine. If user's prior activities associated with this new request are found, the most frequently used activity is returned and its priority is incremented. The new modified query is then used to retrieve a website or to perform a search.

For example, if a user located in Palo Alto, Calif., is searching for "used cars" using Yahoo search engine for the first time, the inventive toolbar sends the request to the inventive software. If the software algorithm does not find any associated activities related to "cars" or "used cars", then only the location is added to the "used cars" query and the modified query "used cars+Palo Alto, Calif." gets sent to Yahoo search engine the search results. Each "used" and "cars" get their indexes incremented by one. The database may look like cars[1], used[1].

When, subsequently to the aforesaid first search, the same user searches for "Nissan Maxima", the inventive software algorithm queries the database of previous user activities for activities associated with "Nissan Maxima". If an entry "used cars" is found in the database, the inventive software modifies the user query to become "used Nissan Maxima cars", which is subsequently sent to Yahoo search engine. Indexes are incremented for terms cars[2], used[2], nissan[1] and maxima[1] and the corresponding entries are added to the database.

Figure 6:
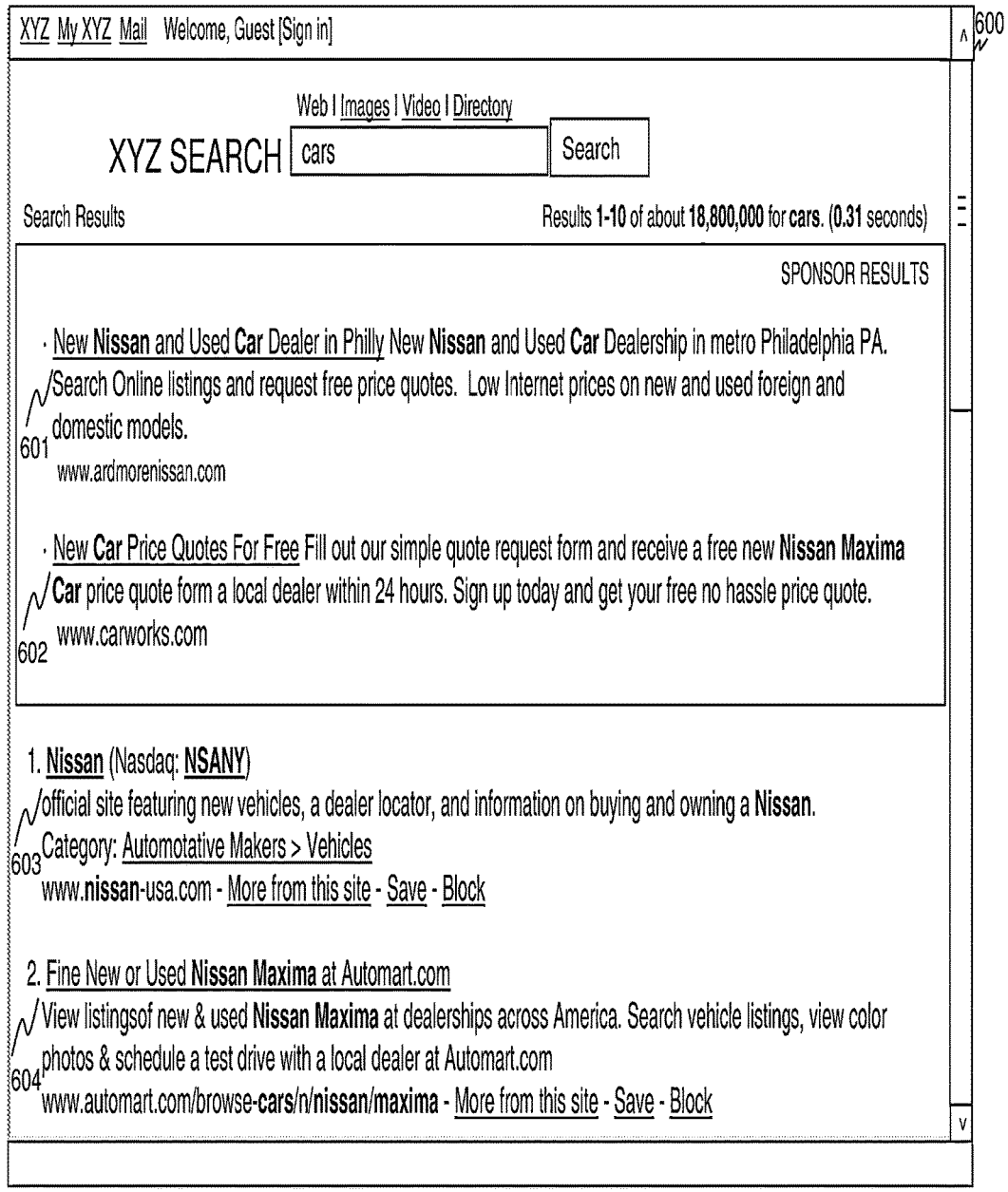
FIG. 6 illustrates exemplary user-preference based search results generated in accordance with the inventive concept.

The information on the user's preferences is subsequently added by the inventive system to the query string issued to the search engine, such that the search engine algorithm uses the added preference information to perform the search. For example, if a user searches for cars and the inventive system determines, based on user's prior online activities, that the user is likely to prefer Nissan cars over other car makes, then the inventive system would change the user's query from "cars" to "cars+nissan". A search engine algorithm would then receive and additional search term reflecting the likely preference of the user and return the relevant results. FIG. 6 illustrates exemplary user-preference based search results generated in accordance with the inventive concept.

Described above was the inventive process for modifying user's query, wherein the query is re-written by the inventive system and sent to the Ad Warehouse 503, media company, or a search engine. In another, alternative embodiment of the invention, the inventive filter software 505 processes user requests and websites to display customized and targeted results to the user. For example, a web site like Yahoo can have multiple advertisers for its front page. The inventive filter algorithm allows Yahoo to expose advertisers targeted to each user by their previous online interests, websites visited, and/or action performed. If Nissan, BMW, and Ford all desire to advertise on Yahoo, the inventive filter software processes a data file on each user's computer where all visited URLs and visited content is stored, the inventive algorithm filters this information based on user's interests, location, and time. In this manner, the inventive algorithm determines which of the multiple available advertisers Yahoo should expose to which user. If user Joe likes BMW, then, when visiting Yahoo.com, the inventive system enables the user to be shown BMW advertising on the front page instead of a Nissan or any other brand.

To be able to interoperate with the inventive filter software and to enable this software to perform user activity customization, any affiliated web entities, including, without limitation, search engines, publishers, media companies, ad warehouses, may modify their respective code. Specifically, a special code may be included within the home page html code that would provide information to the inventive filter on available options. By way of an example, this additional code may be in the following form: <ads><option value="nissan" url="url1"><option value="bmw" url="url2"><option value="ford" url="url3"></ads>, wherein the "url1" and "url2" are internet addresses where the advertisements may be retrieved from.

In the above example, while processing the Yahoo homepage, the inventive toolbar sends a request for Nissan, BMW and Ford to determine which brand is of the most interest to the user. If the determination is made, then the appropriate URL is invoked to display the corresponding advertisement. For example, if Nissan is found to be more interesting for the user, "url1" is used.

As it would be appreciated by those of skill in the art, an embodiment of the inventive system, wherein the user preference information is held on user's own computer is advantageous because of enhanced privacy protection of the user's information.

It should be noted that the present invention is not limited solely to inclusion of location, time and/or user preference information into a search engine query. Such information may also be included with user's request for any network resource, including requests for specific internet resources, such as web pages, advertisements, commercials, video/music, or other Internet content. The network entity responding to the user request, such as a web server, receives the associated location, time and/or user preference information from the inventive system and provides the user with the advertising materials based on the received information. Therefore, in the embodiment shown in FIG. 5, the information on user preferences is included with a webpage request sent to a service on the Internet 504, which responds by including matching advertisement together with its response to user's request. In addition, the inventive system may use the location, time and/or user preference information to identify and specify to the network resource providing entity (a search engine or a web server) a particular advertisement located within the advertisement warehouse 503.

For example, an embodiment of the inventive system can be used for providing online Internet television commercials to users by customizing commercials to each user based on the user's location, time, and interests.

In an embodiment of the inventive methodology, when an Internet user authenticates with a wireless or a LAN network and begins to browse the Internet, the inventive software algorithm automatically determines the user's likely interests based on the information on user's prior online activity, which is stored by the inventive system. At any point in time when a user conducts a search or when advertisings are displayed to the user in response to user's requests for Internet resource, the additional information related to the user is added to the appropriate search query, resource request or otherwise sent to the advertiser. The advertiser, in turn, responds by providing relevant advertising materials to the user.

Clients can request an Internet resource either through the inventive gateway/server 103 or, alternatively, through client's own Internet service provider. If the client connects to the Internet through the server 103, the inventive server 103 uses the stored data about the user and user's preferences to generate user interest information. Specifically, the inventive server 103 keeps track or user's prior requests and compares this information to the content of the presently requested webpage. Interest information, which may be contained in a variable, is sent to Ad Warehouse 503 (or Search Engine 105) that determines what advertisements should be displayed to the user.

If a user connects through user's own Internet Service Provider, the inventive filter software 505 running on the user's client computer 101 analyzes user's request for a web content or user's search query and appends thereto the aforementioned user interest information derived from the user data stored locally on the user's client computer 101. The modified request or query is sent to the Ad Warehouse 503 or to the search engine 105. The Ad Warehouse (or Search Engine) determines, based on the provided user interest information, which advertisings should be displayed to the user. In both cases, webpage content is retrieved from the Internet and combined with the advertisements selected and returned by Ad Warehouse 503.

An aspect of the inventive methodology enables an advertiser to display their advertisings on the sites that are not affiliated with the advertiser. The inventive technique places a small frame toolbar on top of every page showing advertisings related to the content displayed in the main page. Specifically, every time a webpage is requested by a user running the inventive software, the software adds a small frame on top of every displayed page. The frame is connected to ad management software and displays relevant advertisings on all websites that the user visits. The inventive software selects the advertisements for display based on the displayed content as well as the location, time and/or preferences of the user, as described hereinabove.

Figure 7:
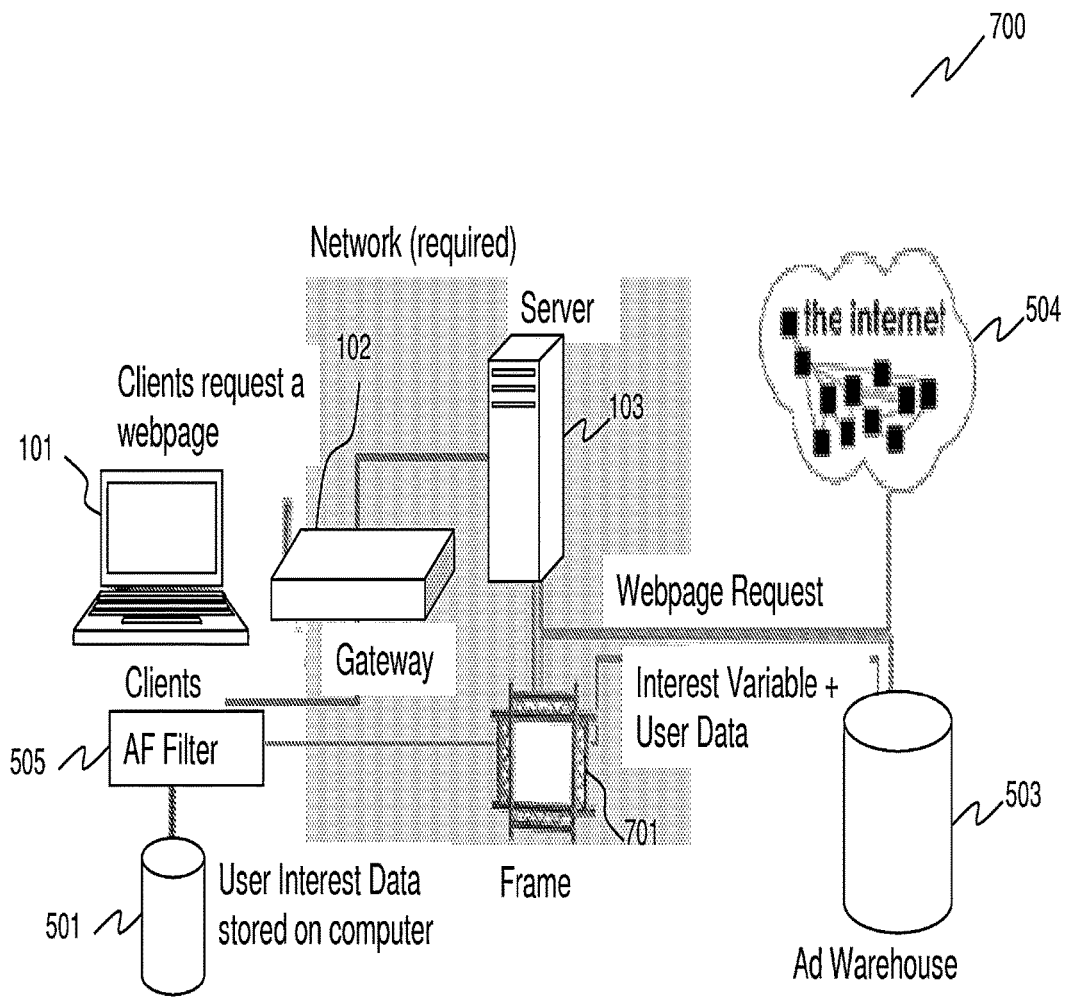
FIG. 7 illustrates an exemplary embodiment of a system utilizing the inventive advertising frame.
Figure 8:
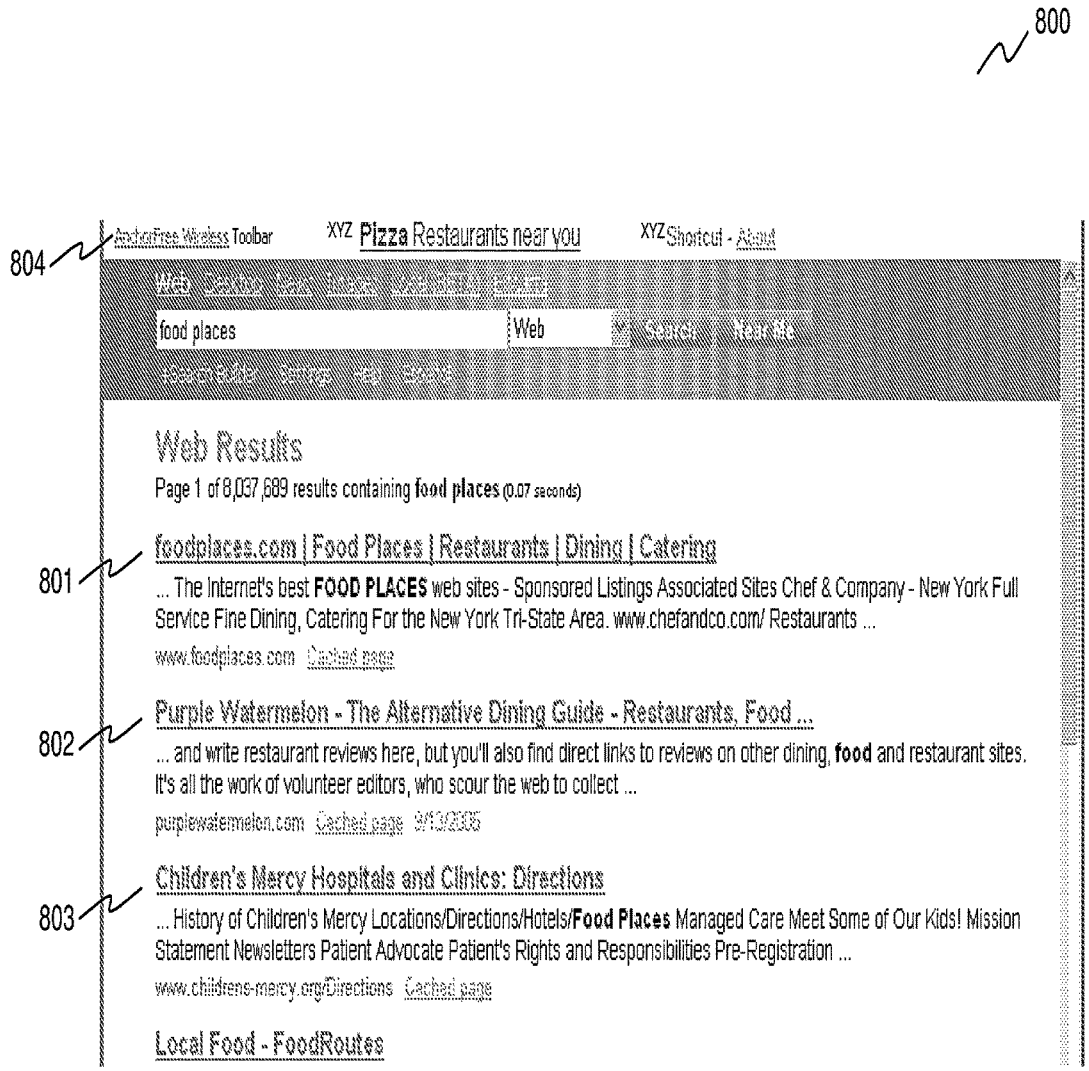
FIG. 8 depicts an exemplary embodiment of a browser page containing the inventive frame.

FIG. 7 illustrates an exemplary embodiment of a system utilizing the inventive advertising frame. The depicted system operates in the following manner. First, the Internet user requests a webpage using the client computer 101, which is connected to the network via gateway 102. Responsive to the user's request, the inventive server 103 retrieves the page content from the Internet. At the same time, the software implementing the inventive frame 701 requests advertisements from the Ad Warehouse 503, providing to the AD Warehouse 503 relevant information about the preferences of the user, the location and time of use, as well as the content of the particular website visited. The frame software obtains the relevant information about the user from the filter 505, which executes on the user's computer. Additionally or alternatively, the frame software may receive user interest data from the server 103. Finally, the content of the requested resource is returned to the user together with the relevant advertising(s), which are displayed by the frame. FIG. 8 depicts an exemplary embodiment of a browser page containing the inventive frame 804 displayed at the top of search engine results 801-803.

Figure 9:
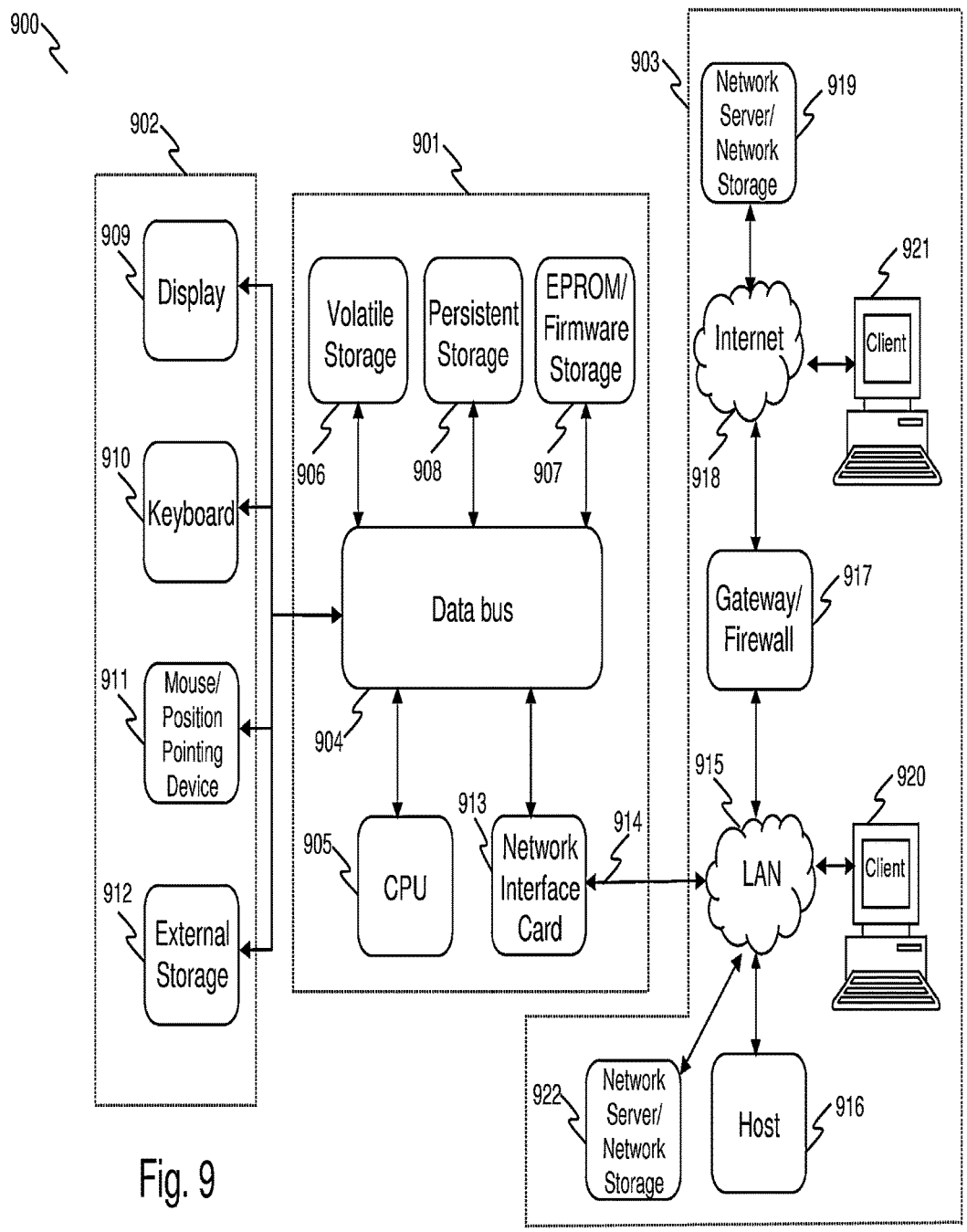
FIG. 9 illustrates an exemplary embodiment of a computer platform upon which the inventive content processing system may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive server 103 may reside on a machine such as computer platform 901. In an embodiment, the location database 104 may also be deployed on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

It should be noted that the present invention is not limited to any specific types of wireless or wired network protocols. The requisite network configuration may be achieved using a variety of known networking protocols.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized networking system. It is intended that the specification and examples be considered as exemplary only, with a true scope and spirit of the invention being indicated by the following claims.

What is claimed is:

1. A computerized system for processing a user request, the system comprising:
   a. a client computer system directly accessed by the user, having a central processing unit, wherein the client computer system is operable to receive the user request and wherein the user request is directed to a network entity;
   b. a gateway connecting the client computer system with the network;
   c. a location database storing location information, wherein the location database is executing on a database server comprising a second central processing unit;
   d. a time information module for generating current local time information; and
   e. a server comprising a third central processing unit and operable to:
      i. receive the user request;
      ii. receive network address information of the user from the gateway;
      iii. provide the received network address information to the location database;
      iv. receive the user location information from the location database;
      v. receive the current local time information from the time information module;
      vi. append the received location information and the received current local time information to the user request to produce the modified user request; and
      vii. forward the modified user request to the network entity, wherein the client computer system stores information on preferences of the user, the stored information on preferences of the user being not accessible to any other entity except for the client computer system,
      wherein the network entity comprises a search engine, wherein the user request is a search engine query and wherein an information is received from the network entity responsive to the modified user request, the received information comprising search results responsive to the user request together with a plurality of advertisements related to the search results, and
      wherein the client computer system is configured to select at least one of the plurality of advertisements for displaying to the user based on the stored information on preferences of the user, wherein the selection is performed on the client computer system.

2. The computerized system of claim 1, further comprising a user information store for storing and supplying user information to the server; wherein the server is additionally operable to receive user information from the user information store and add the received user information to the modified user request.

3. The computerized system of claim 2, wherein the user information store is located on the server.

4. The computerized system of claim 2, wherein the user information store is located on the client computer system.

5. The computerized system of claim 2, wherein the user information comprises user preference information.

6. The computerized system of claim 2, wherein the user information comprises user demographic information.

7. The computerized system of claim 2, wherein the user information comprises user age information.

8. The computerized system of claim 1, wherein the user location information comprises the city where the user is located.

9. The computerized system of claim 1, wherein the user location information comprises the street where the user is located.

10. The computerized system of claim 1, wherein the client computer system is additionally operable to receive the content responsive to user's request from the network entity and to display the received content to the user.

11. The computerized system of claim 10, wherein the received content comprises an advertising material.

12. The computerized system of claim 11, wherein the network entity comprises an ad warehouse operable to store a plurality of advertising materials and to provide the advertising material based on the received modified user request.

13. The computerized system of claim 11, wherein the advertising material is displayed in a frame separately from the received content.

* * * * *